United States Patent
Tsubaki

(10) Patent No.: US 9,440,675 B2
(45) Date of Patent: Sep. 13, 2016

(54) ELECTRIC POWER STEERING APPARATUS

(71) Applicant: NSK LTD., Tokyo (JP)

(72) Inventor: Takahiro Tsubaki, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/410,301

(22) PCT Filed: Feb. 3, 2014

(86) PCT No.: PCT/JP2014/052460
§ 371 (c)(1),
(2) Date: Dec. 22, 2014

(87) PCT Pub. No.: WO2014/136516
PCT Pub. Date: Sep. 12, 2014

(65) Prior Publication Data
US 2016/0016606 A1    Jan. 21, 2016

(30) Foreign Application Priority Data

Mar. 7, 2013   (JP) .................................. 2013-45663

(51) Int. Cl.
*B62D 5/04*   (2006.01)
*B62D 6/00*   (2006.01)

(52) U.S. Cl.
CPC ........... *B62D 5/0472* (2013.01); *B62D 5/0463* (2013.01); *B62D 6/002* (2013.01)

(58) Field of Classification Search
CPC   B62D 5/0472; B62D 15/0235; B62D 1/286; B62D 1/28; G05D 1/0206; A01B 69/007
USPC ........ 701/41, 42; 180/446, 415; 114/144 A; 56/10.2 A
See application file for complete search history.

(56) References Cited

U.S. PATENT DOCUMENTS

| | | | |
|---|---|---|---|
| 3,952,681 A * | 4/1976 | Tucker | G05D 1/0206 114/144 A |
| 6,050,359 A * | 4/2000 | Mouri | B62D 7/159 180/168 |
| 6,067,782 A * | 5/2000 | Diekhans | A01B 69/007 56/10.2 A |
| 6,170,600 B1 * | 1/2001 | Shimizu | B62D 1/28 180/446 |
| 2006/0090952 A1 * | 5/2006 | Ito | B62D 15/0235 180/446 |
| 2013/0041557 A1 * | 2/2013 | Endo | B62D 1/286 701/42 |

FOREIGN PATENT DOCUMENTS

| | | |
|---|---|---|
| JP | 63-19386 B2 | 4/1988 |
| JP | 08-310417 A | 11/1996 |
| JP | 2002-369565 A | 12/2002 |
| JP | 2004-17881 A | 1/2004 |

(Continued)

OTHER PUBLICATIONS

International Search Report for PCT/JP2014/052460 dated Apr. 28, 2014.

*Primary Examiner* — Yuri Kan
(74) *Attorney, Agent, or Firm* — Sughrue Mion, PLLC

(57) ABSTRACT

An electric power steering apparatus that is capable of performing the automatic steering control without using any particular parts in a vehicle having functions of the automatic steering control and the manual steering control, and improves accuracy of the automatic steering by comprising a damping control function and correcting the target steering angle by the calculated actual steering angle.

3 Claims, 8 Drawing Sheets

(56) References Cited

FOREIGN PATENT DOCUMENTS

| JP | 2004-042769 A | 2/2004 |
| JP | 2006-123663 A | 5/2006 |
| JP | 4097134 B2 | 6/2008 |
| JP | 2010-100091 A | 5/2010 |
| JP | 2012-101674 A | 5/2012 |
| JP | 2012-106678 A | 6/2012 |

* cited by examiner

PRIOR ART

ELECTRIC POWER STEERING APPARATUS

CROSS REFERENCE TO RELATED APPLICATIONS

This application is a National Stage of International Application No. PCT/JP2014/052460 filed Feb. 3, 2014, claiming priority based on Japanese Patent Application No. 2013-045663, filed Mar. 7, 2013, the contents of all of which are incorporated herein by reference in their entirety.

TECHNICAL FIELD

The present invention relates to an electric power steering apparatus that has functions of an automatic steering control (parking support mode) and a manual steering control and provides a steering system of a vehicle with an assist force generated by a motor, and in particular to an electric power steering apparatus capable of improving performances by performing a steering angle control that carries out an automatic steering which makes an actual steering angle follow up a target steering angle with a high accuracy and without using any particular parts.

BACKGROUND ART

An electric power steering apparatus which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a PWM (Pulse Width Modulation) control.

A general configuration of the conventional electric power steering apparatus will be described with reference to FIG. 1. As shown in FIG. 1, a column shaft (a steering shaft or a handle shaft) 2 connected to a steering wheel (a steering handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a steering assist command value of an assist command on the basis of a steering torque Th detected by the torque sensor 10 and a vehicle velocity Vel detected by a vehicle velocity sensor 12, and controls a current supplied to the motor 20 on the basis of a current control value E obtained by performing compensation and so on with respect to the steering assist command value. Moreover, it is also possible to receive the vehicle velocity Vel from a CAN (Controller Area Network) and so on.

In such an electric power steering apparatus, for example, the control unit 100 has a configuration disclosed in Japanese Published Unexamined Patent Application No. 2002-369565 A.

As shown in FIG. 2, the motor 20 for generating the steering assist torque of the steering apparatus is driven by a motor driving section 21, the motor driving section 21 is controlled by the control unit 100 indicated by a dashed-two dotted line, and the steering torque Th from the torque sensor 10 and the vehicle velocity Vel from a vehicle velocity detecting system are inputted into the control unit 100. In the motor 20, a voltage between motor terminals Vm and a motor current value i are measured and outputted.

The control unit 100 comprises a torque system control unit 110 indicated by a dashed line that performs a control by using the steering torque Th and a motor system control unit 120 indicated by a dashed-dotted line that performs a control relating to driving of the motor 20. The torque system control unit 110 comprises an assist amount calculating section 111, a differential control section 112, a yaw rate convergence control section 113, a robust stabilization compensating section 114 and an SAT (Self Aligning Torque) estimation feedback section 115, addition sections 116A and 116B, and a subtraction section 116C. Further, the motor system control unit 120 comprises a compensating section 121, a disturbance estimating section 122, a motor angular velocity calculating section 123, a motor angular acceleration calculating section 124, a motor characteristic compensating section 125, and addition sections 126A and 126B.

The steering torque Th is inputted into the assist amount calculating section 111, the differential control section 112, the yaw rate convergence control section 113 and the SAT estimation feedback section 115, and all of them input the vehicle velocity Vel as a parameter. The assist amount calculating section 111 calculates an assist torque amount on the basis of the steering torque Th. The yaw rate convergence control section 113 inputs the steering torque Th and a motor angular velocity ω, and brakes a movement that the steering wheel whirls to improve the convergence of yaw of the vehicle. Further, the differential control section 112 enhances a control responsibility in the vicinity of a neutral point of the steering and realizes a smooth steering. Moreover, the SAT estimation feedback section 115 inputs the steering torque Th, a signal obtained in the addition section 116A by adding the output of the differential control section 112 to the output of the assist amount calculating section 111, the motor angular velocity ω calculated by the motor angular velocity calculating section 123 and a motor angular acceleration α from the motor angular acceleration calculating section 124 to estimate an SAT, performs a signal processing by using a feedback filter with respect to the estimated SAT, and provides the steering wheel with a suitable road information as a reaction force.

Further, a signal that is obtained in the addition section 116B by adding the output of the yaw rate convergence control section 113 to a signal obtained in the addition section 116A by adding the output of the differential control section 112 to the output of the assist amount calculating section 111, is inputted into the robust stabilization compensating section 114 as an assist amount AQ. For example, the robust stabilization compensating section 114 is a compensating section disclosed in Japanese Published Unexamined Patent Application No. H8-290778 A, removes a peak value in a resonance frequency of a resonance system comprised of an inertia element and a spring element that are included in the detected torque, and compensates a phase shift of the resonance frequency that harms the responsiveness and the stability of the control system. By subtracting the output of the SAT estimation feedback section 115 from the output of the robust stabilization compensating section 114 in the subtraction section 116C, an assist amount Ia capable of transmitting the road information to the steering wheel as the reaction force, is obtained.

Moreover, the motor angular velocity calculating section 123 calculates the motor angular velocity ω on the basis of the motor inter-terminals voltage Vm and the motor current value i, and the motor angular velocity ω is inputted into the motor angular acceleration calculating section 124, the yaw rate convergence control section 113 and the SAT estimation feedback section 115. The motor angular acceleration calculating section 124 calculates the motor angular acceleration α on the basis of the inputted motor angular velocity co, and the calculated motor angular acceleration α is inputted into the motor characteristic compensating section 125 and the SAT estimation feedback section 115. In the addition sections 126A, the assist amount Ia obtained by subtracting the output of the SAT estimation feedback section 115 from the output of the robust stabilization compensating section 114, is added to the output Ic of the motor characteristic compensating section 125, and then this added signal is inputted into the compensating section 121 comprised of a differential compensating section or the like as a current command value Ir.

A signal that is obtained by adding the output of the disturbance estimating section 122 in the addition section 126B to a current command value Ira obtained by compensating the current command value Ir by means of the compensating section 121, is inputted into the motor driving section 21 and the disturbance estimating section 122. The disturbance estimating section 122 is an apparatus disclosed in Japanese Published Unexamined Patent Application No. H8-310417 A, is capable of maintaining a desired motor control characteristic in an output reference of the control system on the basis of a signal obtained by adding the output of the disturbance estimating section 122 to the current command value Ira compensated by the compensating section 121 that is the control target of the motor output and the motor current value i, and does not lose the stability of the control system.

In such an electric power steering apparatus, recently, vehicles equipped with a parking support function (parking assist) that switches the automatic steering control and the manual steering control appear. In a vehicle equipped with the parking support function, a target steering angle is set on the basis of data from a camera (image), a distance sensor or the like, and the automatic steering control which makes an actual steering angle follow up the target steering angle, is performed.

In an electric power steering apparatus having conventionally well-known functions of the automatic steering control (parking support mode) and the manual steering control, back parking and parallel parking are performed automatically by controlling an actuator (a motor) on the basis of a pre-stored relation between a moving distance of the vehicle and a turning angle.

Then, a conventional steering control apparatus detects the actual steering angle from a steering angle sensor provided on the steering wheel, calculates a motor current command value so as to make the actual steering angle coincide with the target steering angle set dependent on the vehicle, and realizes the automatic steering control. For example, in an automatic steering device disclosed in Japanese Patent No. 4097134 B2 (Patent Document 1), in the case that the magnitude of a tire torsion force obtained by a tire torsion force calculating means is less than or equal to a friction torque of the steering mechanism, a motor's drive current value generated is gradually decreases to zero to control.

THE LIST OF PRIOR ART DOCUMENTS

Patent Documents

Patent Document 1: Japanese Patent No. 4097134 B2

SUMMARY OF THE INVENTION

Problems to be Solved by the Invention

However, in the conventional automatic steering control, since the resolution of the steering angle sensor provided on the steering wheel is low, it is difficult to perform the steering angle control with a high accuracy, and the steering angle sensor's low resolution becomes the cause of oscillations, positional displacements and so on.

The present invention has been developed in view of the above-described circumstances, and an object of the present invention is to provide an electric power steering apparatus that is capable of performing the automatic steering control without using any particular parts in a vehicle having functions of the automatic steering control and the manual steering control, and simultaneously improves accuracy of the automatic steering by comprising a damping control function and correcting the target steering angle by the calculated actual steering angle.

Means for Solving the Problems

The present invention relates to an electric power steering apparatus that calculates a first motor current command value on the basis of a steering torque and a vehicle velocity, performs an assist control of a steering system by driving a motor on the basis of said first motor current command value, and has a function for switching between an automatic steering control and an manual steering control, the above-described object of the present invention is achieved by that comprising: a steering angle control section that calculates a second motor current command value in said automatic steering control so as to bring a first actual steering angle close to a target steering angle set on the basis of a moving target position of a vehicle; and a switching section that inputs said first motor current command value and said second motor current command value and is switched by a switching signal, wherein said steering angle control section comprises an actual steering angle calculating section that calculates a second actual steering angle on the basis of said first actual steering angle, said steering torque and a motor rotation angle and calculates said second motor current command value on the basis of said target steering angle and said second actual steering angle.

Further, the above-described object of the present invention is more effectively achieved by that wherein said steering angle control section further comprises a rate limiter that smoothes said target steering angle; a current command value calculating section that calculates a first correction current command value on the basis of an output of said rate limiter and said second actual steering angle; a damping control section that calculates a second correction current command value by performing a proportional and differential control on said steering torque; and an output section that outputs said second motor current command value from said first correction current command value and said second correction current command value; or wherein said current command value calculating section comprises a position control section comprised of a first proportional section that inputs a first deviation between said output of said rate limiter and said second actual steering angle; and a velocity control section that inputs a motor velocity command value from said position control section, obtains a second deviation between said motor velocity command value and a motor angular velocity, is comprised of an integral section for inputting said second deviation and a second proportional section for inputting said motor angular velocity, and outputs said first correction current command value; or wherein a low pass filter (LPF) is provided at a post-stage of said rate limiter; or wherein in calculation at a second time or after said second time of said automatic steering control, said actual steering angle calculating section uses said first actual steering angle, said steering torque and said motor rotation angle that are used for a first time, and performs said calculation.

Effects of the Invention

According to an electric power steering apparatus of the present invention, in a vehicle having functions of the automatic steering control (parking support function) and the manual steering control, since an actual steering angle calculating section without using any particular parts accurately calculates the actual steering angle, it is possible to perform the automatic steering control which makes the actual steering angle follow up the target steering angle with a high accuracy. With respect to the actual steering angle calculated by the actual steering angle calculating section according to the present invention, since its angle resolution becomes an angle resolution obtained by dividing the resolution of a motor detection angle by a reduction ratio further, compared with the resolution of a general steering wheel detection angle, the angle resolution of the actual steering angle according to the present invention is improved.

Further, according to the electric power steering apparatus of the present invention, even in the case that communication between an ECU on vehicle side and an ECU on EPS side is temporarily interrupted, it is possible to perform the steering angle control calculation.

BRIEF DESCRIPTION OF THE DRAWINGS

In the accompanying drawings.

MODE FOR CARRYING OUT THE INVENTION

In the present invention, an electric power steering apparatus of a vehicle having functions of an automatic steering control and a manual steering control, accurately calculates an actual steering angle by means of an actual steering angle calculating section without using any particular parts, and performs the automatic steering control which makes the actual steering angle follow up a target steering angle with a high accuracy. The target steering angle continuously transmitted from the ECU on vehicle side and an initial actual steering angle are transmitted to the ECU on EPS side to start calculation, and the actual steering angle of the steering wheel, a steering torque, a motor angular velocity and a motor rotation angle are obtained, the actual steering angle, the steering torque, the motor angular velocity and the motor rotation angle that are obtained last time and the next target steering angle are used to calculate the actual steering angle and improve the performances.

Hereinafter, an embodiment of the present invention will be described in detail with reference to the accompanying drawings.

Figure 1:
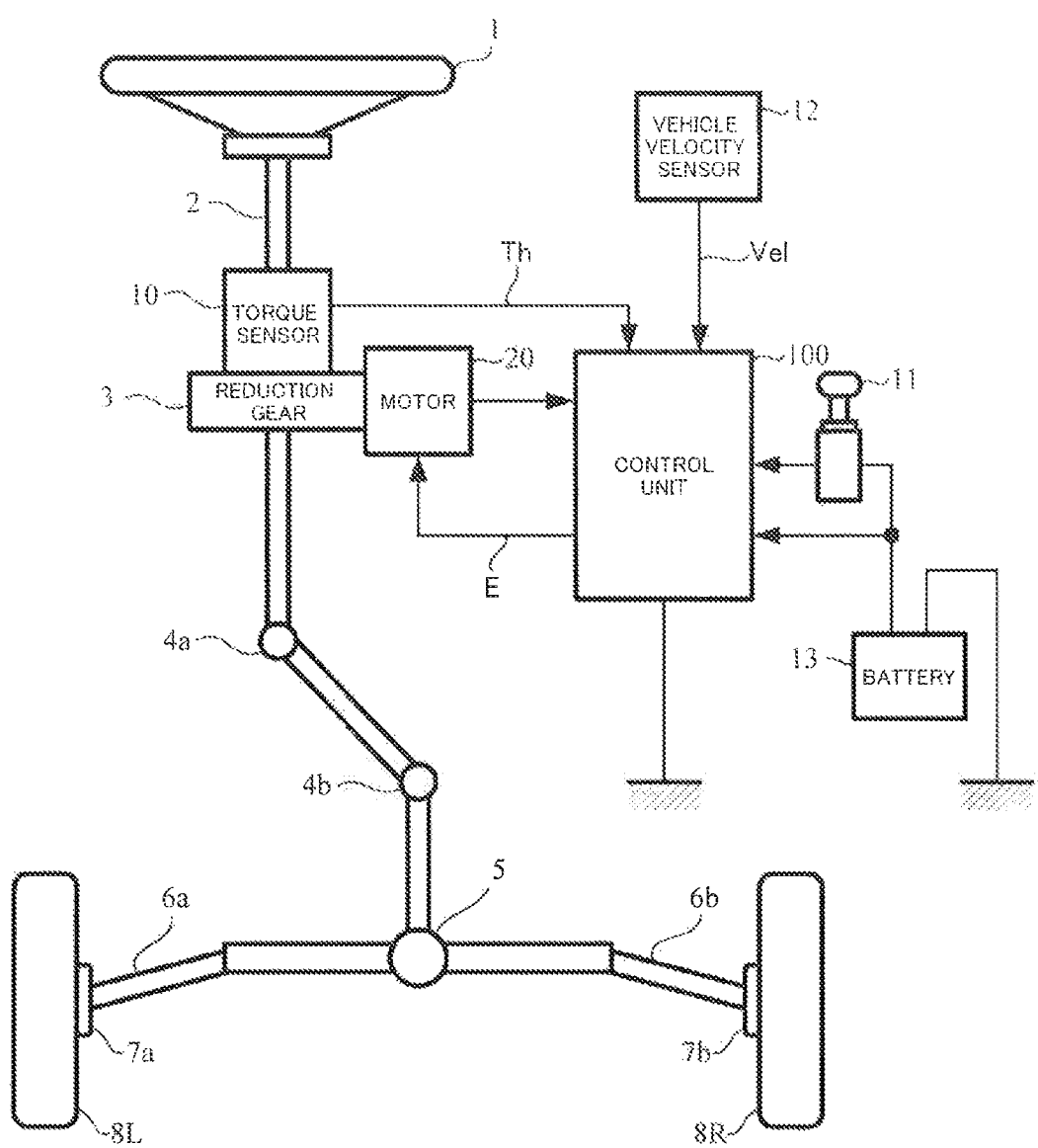
FIG. 1 is a configuration diagram illustrating a general outline of an electric power steering apparatus.
Figure 2:
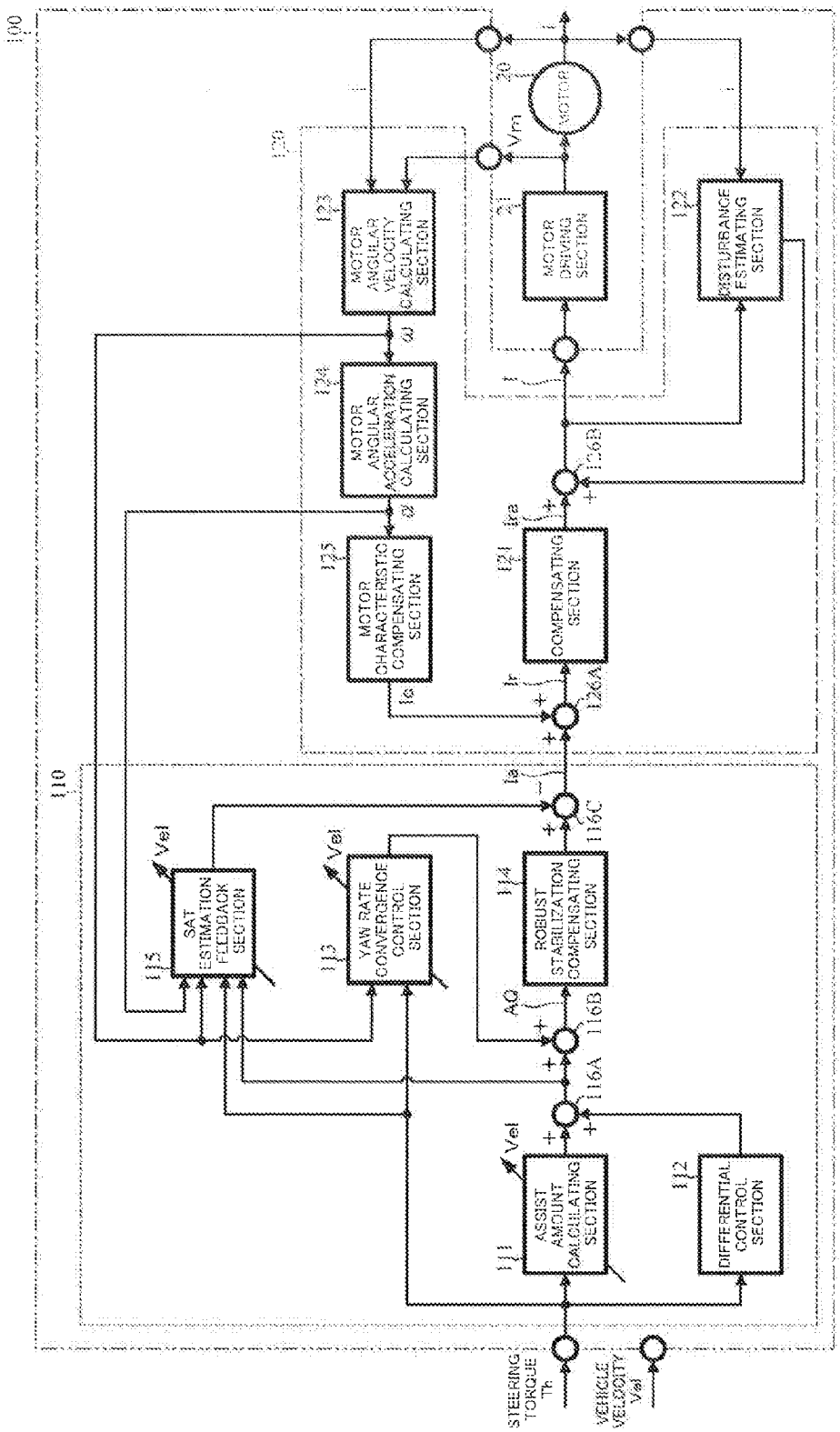
FIG. 2 is a block diagram showing a configuration example of a control system of a conventional electric power steering apparatus.
Figure 3:
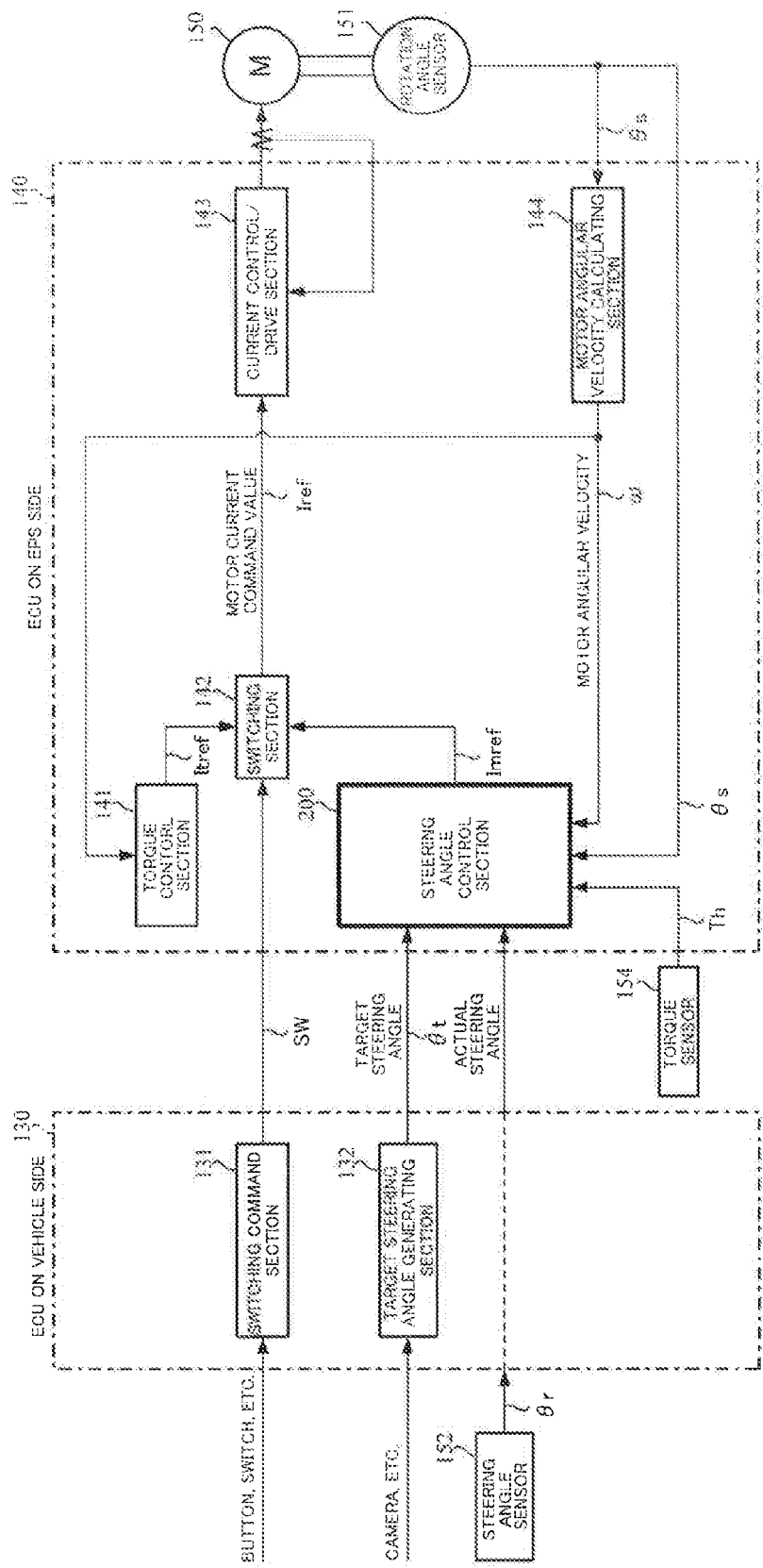
FIG. 3 is a block diagram showing a configuration example of the present invention.

FIG. 3 is a block diagram showing a configuration example of the present invention. As shown in FIG. 3, a rotation angle sensor 151 for detecting a motor rotation angle θs such as a resolver is connected to a motor 150, and the motor 150 is drive-controlled via an ECU on vehicle side 130 and an ECU on EPS (Electric Power Steering apparatus) side 140.

The ECU on vehicle side 130 comprises a switching command section 131 that outputs a switching command SW of the automatic steering control or the manual steering control on the basis of a button, a switch or the like indicating the intention of a driver and a target steering angle generating section 132 that generates a target steering angle θt on the basis of a signal from a camera (image), a distance sensor or the like. Further, an actual steering angle θr detected by a steering angle sensor 152 provided on the column shaft (the handle shaft), is inputted into a steering angle control section 200 within the ECU on EPS side 140 through the ECU on vehicle side 130. The steering angle sensor 152 may be a steering angle estimation value on the basis of the column shaft, the displacement of rack of the rack and pinion, a wheel velocity or the like.

The switching command section 131 outputs the switching command SW on the basis of a signal that identifies entering the automatic steering control, for example, on the basis of the button or the switch indicating the intention of the driver that is provided on a dashboard or on the periphery of the steering wheel, or a vehicle state signal represented by a parking mode or the like provided on the shift, and then the switching command SW is inputted into a switching section 142 within the ECU on EPS side 140. Further, the target steering angle generating section 132 generates the target steering angle θt on the basis of data from the camera (image), the distance sensor or the like by means of a publicly-known method, and inputs the generated target steering angle θt into the steering angle control section 200 within the ECU on EPS side 140.

The ECU on EPS side 140 comprises a torque control section 141 that outputs a motor current command value Itref calculated on the basis of the steering torque Th from a torque sensor 154 mounted at a torsion bar and the motor angular velocity co, the steering angle control section 200 that calculates a motor current command value Imref for the automatic steering control on the basis of the target steering angle θt, the actual steering angle θr, the steering torque Th, the motor rotation angle θs and the motor angular velocity ω and outputs the calculated motor current command value Imref, the switching section 142 that switches between the motor current command values Itref and Imref depending on the switching command SW from the switching command section 131 and outputs a motor current command values Iref, a current control/drive section 143 that drive-controls the motor 150 on the basis of the motor current command value Iref (Itref or Imref) from the switching section 142, and a motor angular velocity calculating section 144 that calculates the motor angular velocity ω on the basis of the motor rotation angle θs from the rotation angle sensor 151.

The switching section 142 switches between a torque control mode (the manual steering control) by the torque control section 141 and the automatic steering control by the steering angle control section 200 on the basis of the switching command SW from the switching command section 131 within the ECU on vehicle side 130, in the manual steering control, outputs the motor current command value Itref as the motor current command value Iref, and in the automatic steering control, outputs the motor current command value Imref as the motor current command value Iref. Further, the current control/drive section 143 comprises a PI (Proportional and Integral) current control section, a PWM control section, an inverter and so on.

Figure 4:
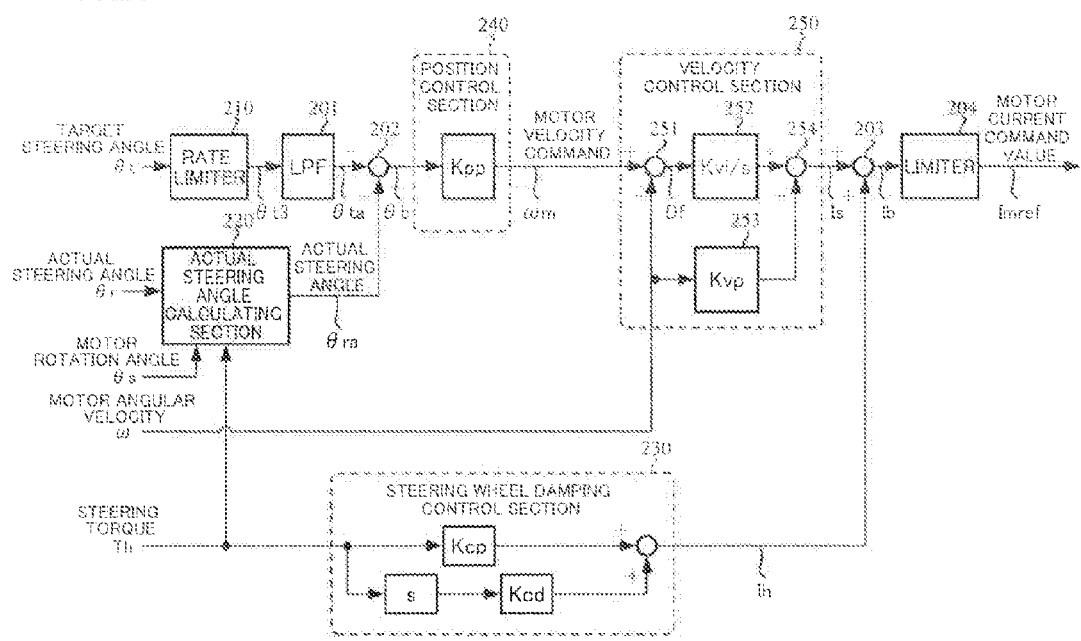
FIG. 4 is a block diagram showing a configuration example of a steering angle control section.

The steering angle control section 200 has a configuration shown in FIG. 4. As shown in FIG. 4, the target steering angle θt is inputted into a rate limiter 210 that performs smoothing when the target steering angle θt changes rapidly, that is, makes the target steering angle θt change smoothly within the range of a predetermined time change rate, and a target steering angle θta passed through an LPF (Low Pass Filter) 201 for removing high-frequency disturbances is addition-inputted into a subtraction section 202. The actual steering angle θr, the motor rotation angle θs and the steering torque Th are inputted into an actual steering angle calculating section 220, an actual steering angle θra calculated by the actual steering angle calculating section 220 is subtraction-inputted into the subtraction section 202, an angle deviation θb between the actual steering angle θra and the smoothed target steering angle θta that high-frequency components are removed, is multiplied by a gain Kpp in a position control section 240 and then addition-inputted into a subtraction section 251 within a velocity control section 250 as a motor velocity command value ωm. The motor angular velocity ω from the motor angular velocity calculating section 144 is subtraction-inputted into the subtraction section 251, the calculated velocity deviation Df is integrated by a gain Kv times in an integral section 252 and then addition-inputted into a subtraction section 254. Further, the motor angular velocity ω is inputted into a proportional section 253 within the velocity control section 250, multiplied by a gain Kvp, and then subtraction-inputted into the subtraction section 254. The subtraction result of the subtraction section 254 is inputted into an addition section 203 as a motor current command value Is.

Moreover, a current command value calculating section is comprised of the position control section 240 and the velocity control section 250.

The steering torque Th from the torque sensor 154 is inputted into the actual steering angle calculating section 220 and simultaneously inputted into a steering wheel damping control section 230 to be PD (Proportional and Differential)-controlled, a correction current command value Ih corrected by proportional and differential is inputted into the addition section 203 and added to the motor current command value Is from the velocity control section 250, a current command value Ib being the addition result is limited by an upper and a lower limit value in a limiter 204 and outputted as the motor current command value Imref. An output section is comprised of the addition section 203 and the limiter 204.

Figure 5:
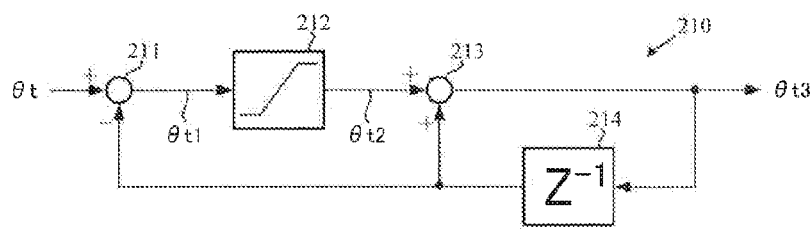
FIG. 5 is a block diagram showing a configuration example of a rate limiter.
Figure 6:
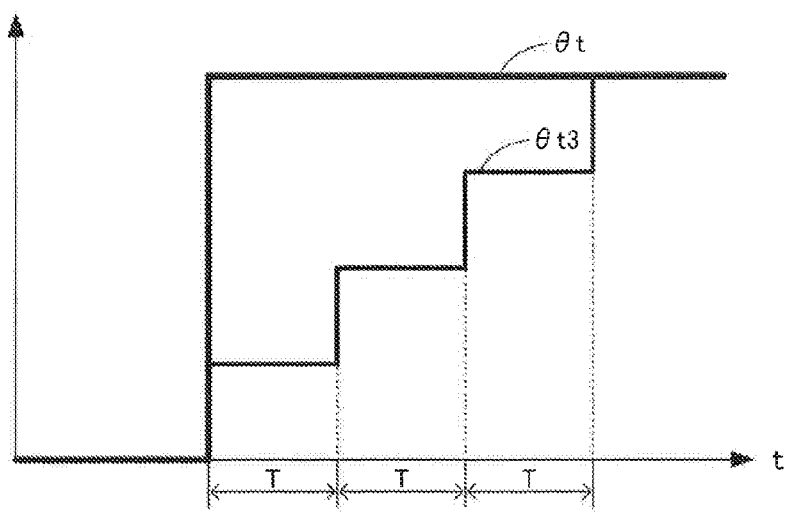
FIG. 6 is a characteristic diagram showing an operation example of the rate limiter.

The rate limiter 210 performs the smoothing with respect to the target steering angle θt and outputs the smoothed target steering angle θt when the target steering angle θt changes rapidly, for example, has a configuration shown in FIG. 5. As shown in FIG. 5, the target steering angle θt is addition-inputted into a subtraction section 211, depending on a steering angle θt1 being the subtraction result obtained by subtracting a past value from the target steering angle θt, a variation amount setting section 212 sets a variation amount θt2. The variation amount setting section 212 sets a difference between the past value from a holding section ($Z^{-1}$) and the input (θt), and the addition result obtained by adding the past value to the variation amount θt2 in an addition section 213 is outputted as a new target steering angle θt3. The variation amount setting section 212 makes the variation amount not exceeding an upper limit and a lower limit that are set, that characteristic obtains the difference with the input (target steering angle) θt at each of calculation periods T, in the case of falling outside the upper limit and the lower limit of the variation amount setting section 212, by repeatedly performing adding the difference to the past value, the output θt3 varies in a staircase pattern shown in FIG. 6 and finally matching the output θt3 with the target steering angle θt. Further, in the case that the difference with the input (target steering angle) θt is within the range of the upper limit and the lower limit of the variation amount setting section 212, since the variation amount θt2 (=the difference θt1) is outputted and added to the past value, the result output θt3 coincides with the input (target steering angle) θt.

As these results, even if the target steering angle θt changes rapidly, it is possible to smoothly vary the target steering angle θt changing rapidly, a rapid current variation (i.e. a rapid steering) is prevented, a function that reduces an uneasy feeling relating to an automatic operation of the driver is fulfilled.

Figure 7:
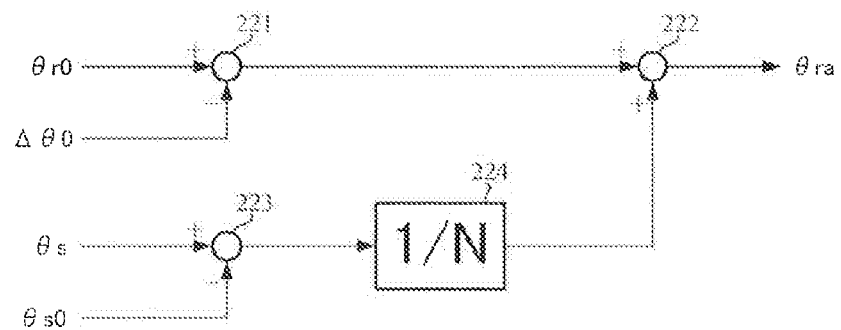
FIG. 7 is a block diagram showing a configuration example of an actual steering angle calculating section.

FIG. 7 is a block diagram showing a configuration example of the actual steering angle calculating section 220. As shown in FIG. 7, an actual steering angle $θr_0$, a torsion angle $Δθ_0$ and a motor rotation angle $θs_0$ (all of them) are the obtained value of the first time, a deviation ($=θr_0-Δθ_0$) between the actual steering angle $θr_0$ and the torsion angle $Δθ_0$ is obtained by a subtraction section 221 and inputted into an addition section 222. Further, a deviation between the motor rotation angle θs and the motor rotation angle of the first time $θs_0$ is obtained by a subtraction section 223, the deviation ($=θs-θs_0$) is divided by a reduction ratio 1/N in a reduction section 224 to become "$(θs-θs_0)/N$" and inputted into the addition section 222, and the actual steering angle of this time era is outputted from the addition section 222.

Moreover, the torsion angle $Δθ_0$ is obtained on the basis of "$Δθ_0=Th/K$" (where K is a spring constant of the torsion bar) from the steering torque Th.

Figure 8:
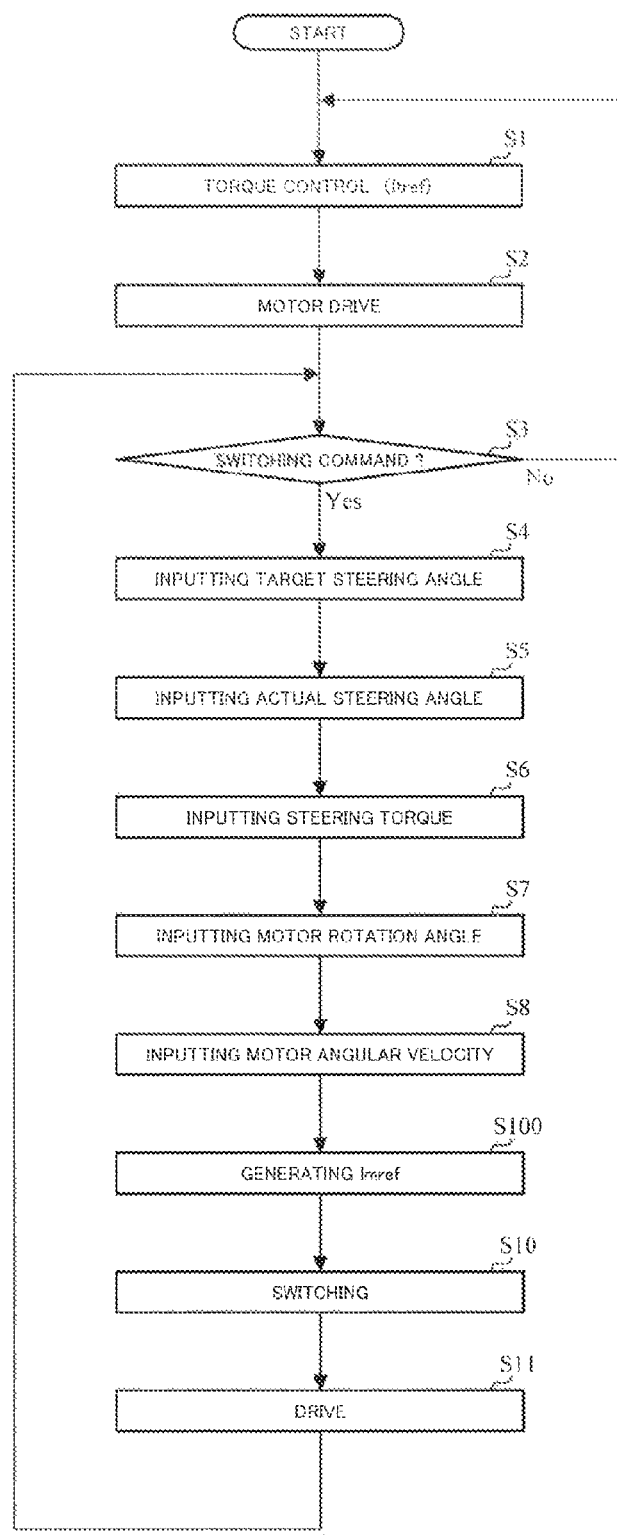
FIG. 8 is a flowchart showing an operation example of the present invention.

In such a configuration, an entire operation example of the present invention will be described with reference to a flowchart shown in FIG. 8.

When the operation of the steering system starts, the torque control (the manual steering mode) by the torque control section 141 is carried out (Step S1), and the motor 150 is driven by using the motor current command value Itref and by means of the current control/drive section 143 (Step S2). The above operations are repeatedly performed until the switching command SW is outputted from the switching command section 131 (Step S3).

When becoming the automatic steering control and the switching command SW is outputted from the switching command section 131, the target steering angle θt is inputted into the steering angle control section 200 from the target steering angle generating section 132 (Step S4), the actual steering angle θr is inputted into the steering angle control section 200 from the steering angle sensor 152 (Step S5), the steering torque Th is inputted into the steering angle control section 200 from the torque sensor 154 (Step S6), the motor rotation angle θs is inputted into the steering angle control section 200 from the rotation angle sensor (Step S7), the motor angular velocity ω is inputted into the steering angle control section 200 from the motor angular velocity calculating section 144 (Step S8), and then the motor current command value Imref is generated by the steering angle control section 200 (Step S100). Moreover, the target steering angle θt, the actual steering angle θr, the steering torque Th, the motor angular velocity ω and the motor rotation angle θs can be inputted in an arbitrary order.

Then, the switching section 142 is switched to the automatic steering control by the switching command SW from the switching command section 131 (Step S10), and the motor 150 is driven by using the motor current command value Imref from the steering angle control section 200 and by means of the current control/drive section 143 (Step S11).

Figure 9:
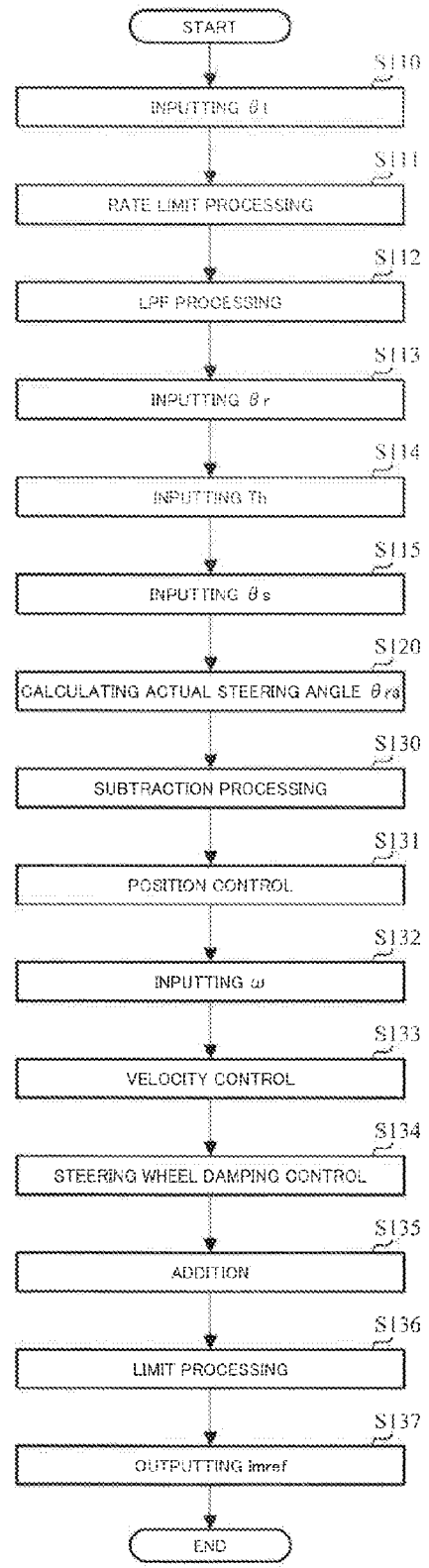
FIG. 9 is a flowchart showing an operation example of the steering angle control section.

Such operations of the automatic steering control will be described in detail with reference to a flowchart shown in FIG. 9.

At first, the rate limiter 210 inputs the target steering angle θt (Step S110) and performs a rate limit processing described as above (Step S111), the LPF 201 performs an LPF-processing (high frequency removing) with respect to the target steering angle θt3 that the rate limit processing is performed and outputs the target steering angle θta (Step S112). Next, the actual steering angle calculating section 220 inputs the actual steering angle θr (step S113), inputs the steering torque Th (step S114), inputs the motor rotation angle θs (Step S115) and calculates the actual steering angle θra (Step S120). Moreover, the actual steering angle θr, the steering torque Th and the motor rotation angle θs can be inputted in an arbitrary order.

The subtraction section 202 subtracts the actual steering angle θra from the target steering angle θta (Step S130), the subtraction result θb (=θta−θra) is inputted into the position control section 240 and the position control is performed, and the motor velocity command value ωm obtained by the position control section 240 is inputted into the subtraction section 251 within the velocity control section 250 (Step S131). Furthermore, the motor angular velocity ω is inputted into the subtraction section 251 and the proportional section 253 (Step S132), and the velocity control section 250 performs a velocity control and outputs the motor current command value Is (Step S133).

Further, the steering torque Th is inputted into the steering wheel damping control section 230 and the steering wheel damping control is performed (Step S134), the correction current command value Ih is inputted into the addition section 203. The addition section 203 adds the correction current command value Ih to the motor current command value Is (Step S135), the limiter 204 performs a limit processing with respect to the current command value Ib being the addition result (Step S136) and outputs the motor current command value Imref (Step S137).

Figure 10:
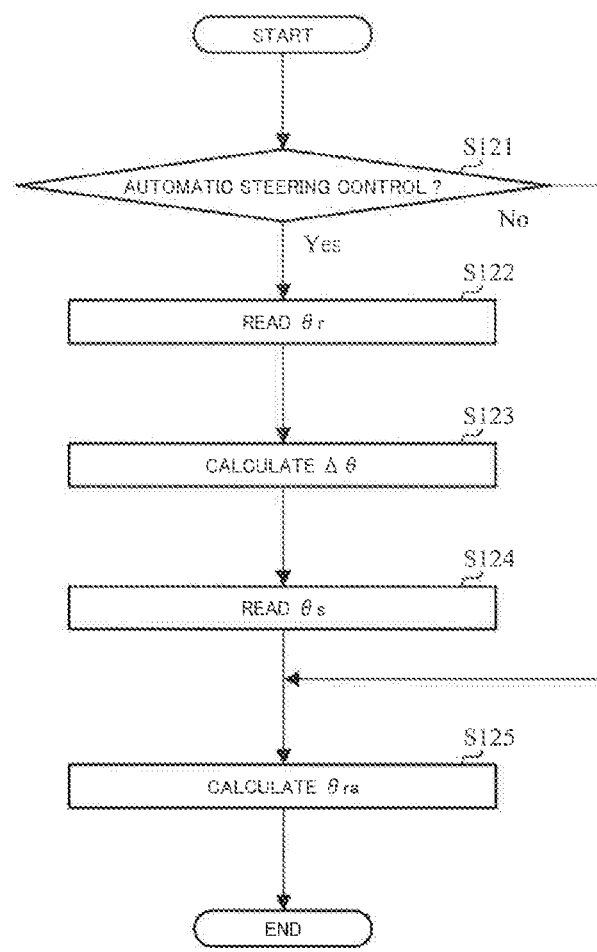
FIG. 10 is a flowchart showing an operation example of the actual steering angle calculating section.

Next, an operation example of the actual steering angle calculating section 220 corresponding to the Step S120 of FIG. 9 will be described with reference to FIG. 10.

Firstly, the actual steering angle calculating section 220 decides whether being the automatic steering control or not (Step S121), as automatic steering control calculation in the first time, reads the actual steering angle θr (Step S122), calculates the torsion angle Δθ$_0$ (Step S123), and reads the motor rotation angle θs (Step S124). And then, the actual steering angle calculating section 220 calculates an accurate actual steering angle θra according to the following Expression 1 (Step S125). Where N is the reduction ratio of the reduction gears.

$$\theta ra = \theta r_0 - \Delta\theta_0 + (\theta s - \theta s_0)/N \qquad \text{[Expression 1]}$$

The actual steering angle θr$_0$, the torsion angle Δθ$_0$ and the motor rotation angle θs$_0$ that are obtained in the first time, are used in calculations in the second time or after the second time of the automatic steering control. Where (θs−θs$_0$) of Expression 1 is a relative steering angle with respect to the motor angle obtained in the first time.

Furthermore, in the case of performing switching of steering modes by the switching section 142, it is also possible to gradually change by using a fade gain. Further, initial values to be used in the actual steering angle calculating section may not be the first values of the steering angle control, for example, may be values during manual steering control except for steering angle control calculation.

EXPLANATION OF REFERENCE NUMERALS 1 steering handle (steering wheel)
2 column shaft (steering shaft or handle shaft)
10, 154 torque sensor
12, 153 vehicle velocity sensor
13 battery
20, 150 motor
21 motor driving section
100 control unit (ECU)
110 torque system control unit
120 motor system control unit
130 ECU on vehicle side
131 switching command section
132 target steering angle generating section
140 ECU on EPS side
141 torque control section
142 switching section
143 current control/drive section
144 motor angular velocity calculating section
151 rotation angle sensor
152 steering angle sensor
200 steering angle control section
201 LPF (Low Pass Filter)
210 rate limiter
230 steering wheel damping control section
240 position control section
250 velocity control section

The invention claimed is:
1. An electric power steering apparatus that calculates a first motor current command value on a basis of a steering torque and a vehicle velocity, performs an assist control of a steering system by driving a motor on a basis of said first motor current command value, and has a function for switching between an automatic steering control and a manual steering control, comprising:

a steering angle control section that calculates a second motor current command value in said automatic steering control so as to bring a first actual steering angle close to a target steering angle set on a basis of a moving target position of a vehicle; and a switching section that inputs said first motor current command value and said second motor current command value and is switched by a switching signal, wherein said steering angle control section comprises:

an actual steering angle calculating section that calculates a second actual steering angle on a basis of said first actual steering angle, said steering torque and a motor rotation angle, and calculates said second motor current command value having a steering wheel damping action on a basis of said target steering angle, said second actual steering angle, said torque and a motor angular velocity;

a rate limiter that smooths said target steering angle;

a current command value calculating section that calculates a first correction current command value on a basis of an output of said rate limiter and said second actual steering angle;

a damping control section that calculates a second correction current command value by performing a proportional and differential control on said steering torque; and an output section that outputs said second motor current command value from said first correction current command value and said second correction current command value; and wherein said current command value calculating section comprises:

a position control section comprised of a first proportional section that inputs a first deviation between said output of said rate limiter and said second actual steering angle; and a velocity control section that inputs a motor velocity command value from said position control section, obtains a second deviation between said motor velocity command value and said motor angular velocity, has an integral section for inputting said second deviation and a second proportional section for inputting said motor angular velocity, and outputs said first correction current command value by adding said second correction current command value to a subtraction result obtained by subtracting an output of said second proportional section from an output of said integral section.

2. The electric power steering apparatus according to claim 1, wherein a low pass filter (LPF) is provided at a post-stage of said rate limiter.

3. The electric power steering apparatus according to claim 1, wherein in a calculation at a second time or after said second time of said automatic steering control, said actual steering angle calculating section uses said first actual steering angle, said steering torque and said motor rotation angle that are used for a first time, and perform said calculation.

* * * * *